US008723658B2

(12) United States Patent
Jean et al.

(10) Patent No.: US 8,723,658 B2
(45) Date of Patent: May 13, 2014

(54) METHOD FOR MANAGING THE STRAIN OF A USER OF A HUMAN PROPULSION VEHICLE, AND VEHICLE ADAPTED FOR SAID METHOD

(75) Inventors: Eric Jean, Bieville-Beuville (FR); Bruno Garin, La Chapelle-Erdre (FR)

(73) Assignee: IMW-Productions, Bieville-Beuville (FR)

( * ) Notice: Subject to any disclaimer, the term of this patent is extended or adjusted under 35 U.S.C. 154(b) by 248 days.

(21) Appl. No.: 13/128,028

(22) PCT Filed: Nov. 6, 2009

(86) PCT No.: PCT/FR2009/001289
§ 371 (c)(1),
(2), (4) Date: Jun. 28, 2011

(87) PCT Pub. No.: WO2010/052395
PCT Pub. Date: May 14, 2010

(65) Prior Publication Data
US 2011/0254673 A1 Oct. 20, 2011

(30) Foreign Application Priority Data
Nov. 7, 2008 (FR) ................................. 08 06256

(51) Int. Cl.
*B62J 3/00* (2006.01)
(52) U.S. Cl.
USPC ..................... 340/432; 340/525; 340/539.19

(58) Field of Classification Search
USPC ......... 340/432, 435, 436, 437–440, 443–449,
340/455, 463, 475, 488, 525, 539.19,
340/539.12–539.13
See application file for complete search history.

(56) References Cited

U.S. PATENT DOCUMENTS

| 5,058,583 A | * | 10/1991 | Geddes et al. | 607/6 |
| 5,553,007 A | * | 9/1996 | Brisson | 702/182 |
| 2007/0190970 A1 | * | 8/2007 | Watson | 455/404.2 |
| 2007/0197261 A1 | * | 8/2007 | Humbel | 455/558 |
| 2007/0238593 A1 | * | 10/2007 | Ellis et al. | 482/148 |
| 2009/0227428 A1 | * | 9/2009 | Tamari et al. | 482/57 |
| 2010/0114239 A1 | * | 5/2010 | Mcdonald, Iii | 607/48 |

FOREIGN PATENT DOCUMENTS

EP 1 295 785 A 3/2003

* cited by examiner

*Primary Examiner* — Daniel Previl
(74) *Attorney, Agent, or Firm* — Muncy, Geissler, Olds & Lowe, P.C.

(57) ABSTRACT

A method of managing physical effort expended by a user of a human-propelled vehicle provided with a control unit connected to an electric motor that is powered by a battery and that is arranged to take the place at least in part of the user for the purposes of propelling and of braking the vehicle, as a function of a program executed by the control unit in order to manage the physical effort expended by the user. A vehicle adapted to this method.

23 Claims, 2 Drawing Sheets

METHOD FOR MANAGING THE STRAIN OF A USER OF A HUMAN PROPULSION VEHICLE, AND VEHICLE ADAPTED FOR SAID METHOD

The present invention relates to a method of managing the effort expended by a user of a human-propelled vehicle, and to a vehicle adapted to implementing the method.

BACKGROUND OF THE INVENTION

It is now widely accepted that regular physical exercise makes it possible to keep the body in good health, to limit the risk of cardiovascular or articular failure, and/or to recover normal functioning of the body after failure thereof. This has a led to unprecedented enthusiasm for physical and/or sports activities such as keep-fit exercises, running, cardio-training, weight training, etc. leading if not to obsession with the body, at least to awareness of the need to look after it, so as to make it last without failing.

It is in this context that there has been a growth in specialist facilities that make various pieces of apparatus available for use by their customers, enabling them to exercise for overall body fitness or for targeting certain portions of the body. All such pieces of apparatus are based substantially on the same principle, namely constraining the user to make an effort that is controlled by means of a device opposing resistance to the user's effort. Sales of such apparatus to private individuals have also developed, but it has been observed that while such apparatus is used fairly frequently soon after purchase, it then tends to be used less and less frequently until, after a few months, it is no longer used at all. That has enabled health and fitness clubs and/or weight training centers to attract customers by emphasizing that they offer personalized training services or coaching, encouraging and motivating members of such clubs to exercise regularly by using the club facilities.

In the medical field, e.g. for physiotherapy and medical rehabilitation, or for determining people's physical capacities, it is also known that patients can be made to do physical exercises by following programs determined by physicians. Such exercises are done on pieces of apparatus situated in a room dedicated for that purpose, and they are supervised by medical staff, and the users of such pieces of apparatus are equipped with sensors for monitoring physiological parameters such as heart rate or lung capacity.

While physical exercise taken indoors in such clubs or rooms offers the advantages of enabling users to be encouraged to exercise regularly and of enabling said users to be supervised and monitored, it suffers from the drawback of constraining users to comply with opening times and to expend physical energy in a closed space that is generally insufficiently ventilated and that presents health risks.

OBJECT OF THE INVENTION

An object of the invention is to propose physical exercise means for enabling a user to take physical exercise, which means make it possible for the user to be free of the above-mentioned constraints, while also guaranteeing a degree of safety as regards the effect on the user's health of the physical effort expended by the user, and while motivating the user to take the physical exercise.

SUMMARY OF THE INVENTION

As stated above, medical and health authorities are encouraging people to expend physical energy and to do exercises as a palliative for the excessively sedentary lifestyle of most people.

In addition, problems of atmospheric pollution and of diminishing natural resources for generating energy are leading an increasing fraction of the population to walk or to use human-propelled vehicles such as kick scooters, roller skates or roller blades, or bicycles for short journeys.

An object of the invention is to manage the effort expended by a user of such a vehicle so as to guarantee said user takes physical excise that is personalized for the purpose of contributing to keeping that user's body fit and in good health.

To this end, the invention provides a method of managing physical effort expended by a user of a human-propelled vehicle provided with a control unit connected to an electric motor that is powered by a battery and that is arranged to take the place at least in part of the user for the purposes of propelling and of braking the vehicle, as a function of a program executed by the control unit in order to manage the physical effort expended by the user, the control unit being connected to a Global Navigation Satellite System (GNSS) device, the method comprising the steps of:

determining firstly target values for at least one physiological parameter and for the effort delivered by the user, and secondly a route towards a predetermined point of arrival; and acquiring information used by the control program, namely at least one geographical location of the vehicle, the physiological parameter of the user, a state of charge of the battery, an effort delivered by the motor, and the effort delivered by the user.

The method of the invention thus makes it possible to transform the human-propelled vehicle into a piece of apparatus for controlled exercise that can be adapted to the user and also to the user's environment. The motor thus delivers varying amounts of assistance and, preferably, over at least a portion of the route, it opposes the effort delivered by the user in order to achieve the target values. The method of the invention may thus be used to force the user to make concentric efforts and/or eccentric efforts.

The invention also provides a human-propelled vehicle provided with a control unit connected to an electric motor that is powered by a battery and that is arranged to take the place at least in part of the user for the purposes of propelling and of braking the vehicle, as a function of a program executed by the control unit, the control unit further being connected to a GNSS device and to acquisition means for acquiring at least one physiological parameter of the user, an effort delivered by the user, a state of charge of the battery, and external data that is external to the user and to the vehicle, the program being arranged to control the GNSS device and to manage the effort delivered by the motor as a function of: target values for the physiological parameter and for the effort delivered by the user; a location of the vehicle relative to a predetermined point of arrival, and information from the acquisition means.

Other characteristics and advantages of the invention appear on reading the following description of a particular and non-limiting implementation of the invention.

BRIEF DESCRIPTION OF THE DRAWINGS

Reference is made to the accompanying drawings, in which.

DETAILED DESCRIPTION OF THE INVENTION

Figure 1:
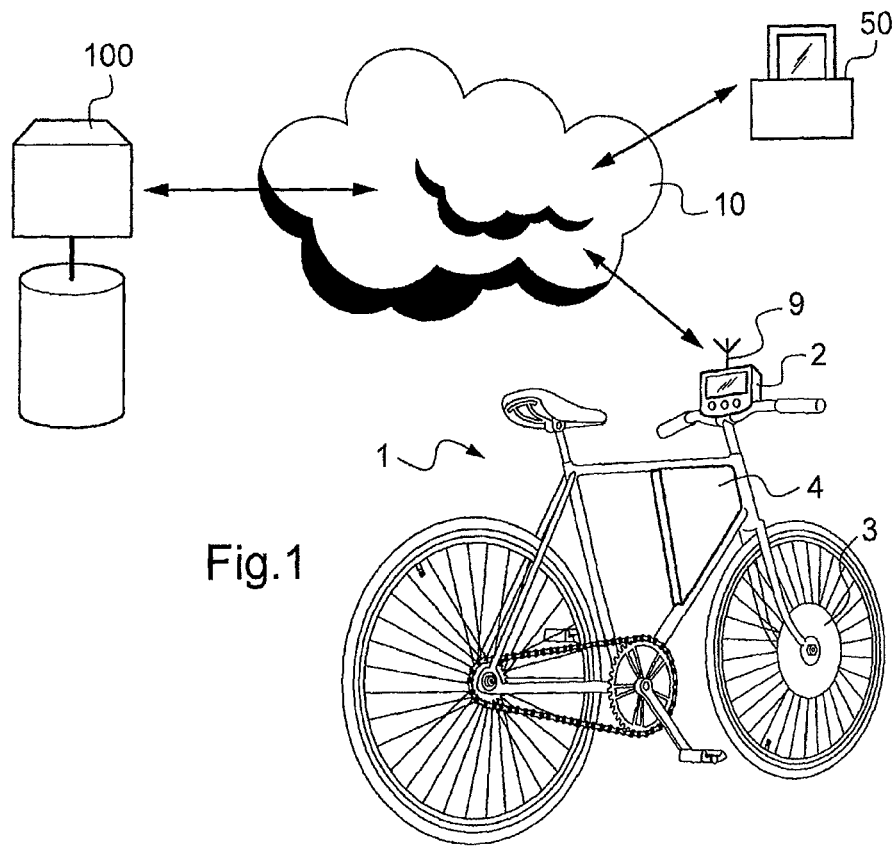
FIG. 1 is a diagrammatic view of a system making it possible to implement the method of the invention.
Figure 2:
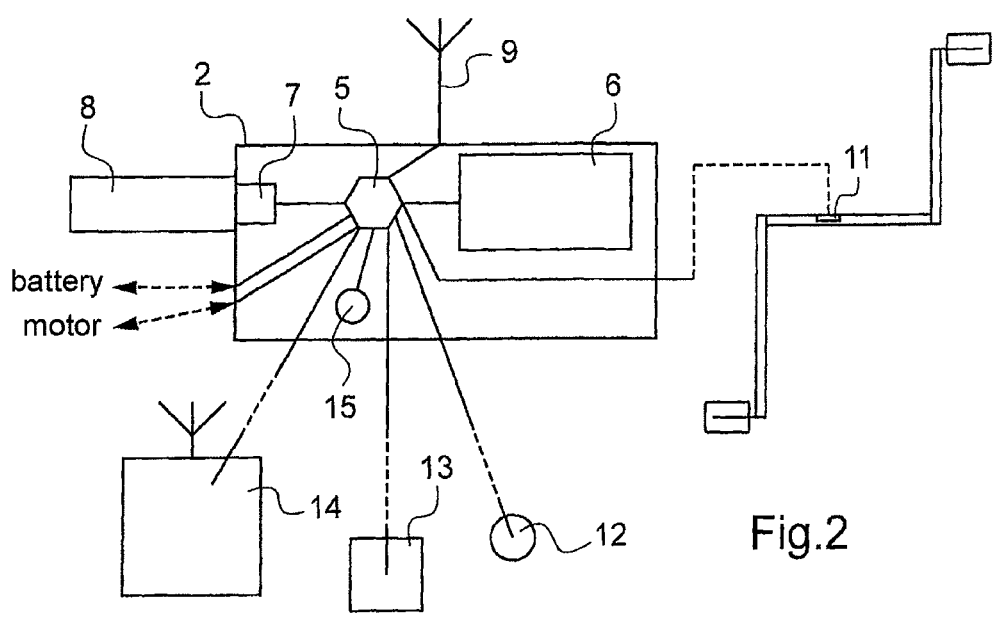
FIG. 2 is a diagrammatic view of the electronic equipment on board the vehicle of the invention.

The invention relates to a method of managing physical effort expended by a user of a human-propelled vehicle. The human-propelled vehicle shown in FIG. 1 is a bicycle designated by overall reference 1, but naturally the method of the invention is applicable to any type of land vehicle, such as a kick scooter, or a pedal car, to any type of water craft, such as a rowing boat, or indeed to any type of aircraft such as a pedal aircraft.

The mechanical structure of the bicycle 1 forming the vehicle of the invention is known per se, and is thus not described in detail below.

However, in addition to having the structure of a conventional bicycle, the bicycle 1 is provided with a control unit 2 connected to an electric motor 3 powered by a battery 4 and arranged to take the place at least in part of the user for propelling and for braking the vehicle as a function of a program executed by the control unit 2.

In a manner known per se, the control unit 2 includes a processor 5 making it possible to execute one or more computer programs recorded in a memory 6 of the control unit 2. The control unit 2 further includes a connector 7 for connecting to an external memory 8 of the "Universal Serial Bus (USB) flash drive" or "memory stick" type, and an antenna 9 for connection to a mobile telecommunications network 10, e.g. of the Global System for Mobile communications (GSM)/General Packet Radio Service (GPRS) type. The connector 7 may be replaced or backed up with a connector complying with some other standard, such as a serial or FireWire port. In the same way, the connection means for connection to the GSM/GPRS network may be replaced or backed up with connection means for connection to some other type of network using another protocol, such as, for example, the Universal Mobile Telecommunications System (UMTS) data transfer protocol.

In this example, the electric motor 3 is fastened to the front wheel of the bicycle and the battery 4 is fastened to the frame of said bicycle. In this example, the battery 4 incorporates a management circuit for managing its state of charge, which circuit is connected to the control unit 2 so as to communicate said state of charge thereto. This type of circuit for managing the state of charge of the battery is known per se, and such circuits are, in general, incorporated directly into smart batteries. The bicycle 1 is provided with a sensor 11 connected to the control unit 2 and mounted on the pedal crank axle. The sensor may also be arranged to detect the tension of the chain or be mounted on the hub of the rear wheel of the bicycle 1 in order to detect the effort exerted by the user on the crankset.

The bicycle 1 is also provided with a sensor 12 for sensing a physiological parameter of the user. In this example, the sensor 12 is a heart rate sensor designed to be fastened to the body of the user. In place of or in addition to the sensor 12, it is possible to provide a blood pressure sensor and/or a cardiac output sensor and/or a body temperature sensor. It should be noted that the heart rate sensors may have electrodes fastened to the handlebar of the bicycle 1 at the locations where the user normally places their hands, so that the sensor does not need to be fastened to the body of the user.

The bicycle 1 is also provided with a sensor 13 for sensing ambient temperature. In place of or in addition to the sensor 13, it is possible to provide an altitude sensor and/or a sensor for sensing the carbon monoxide content in the air, and/or a sensor for sensing the nitrogen oxide content in the air, etc.

The sensors 12 and 13 are connected to the control unit 2.

A GNSS device 14 is also mounted on the bicycle 1 and is connected to the control unit 2. In this example, the GNSS device 14 is of the Global Positioning System (GPS) device type, operating by receiving and processing satellite signals. This device may also be in the form of a dedicated processor incorporated into the control unit 2 and connected to an antenna for transmitting and receiving GPS signals.

The control program executed by the control unit 2 is arranged to control the motor as a function of the following information, namely:
 the geographical location of the vehicle;
 the physiological parameter of the user, which is heart rate in this example;
 the state of charge of the battery;
 the effort delivered by the motor and the effort delivered by the user; and
 data external to the vehicle and to the user, namely, in this example, ambient temperature.

In this example, the control program of the control unit 2 is preferably arranged to receive other kinds of external data communicated by one or more dedicated servers via the mobile telecommunications network 10, and, for example, weather data, the presence of an allergen in the air, and its geographical distribution, the state of road traffic, etc. Certain kinds of external data, such as altitude and traffic difficulties may also be delivered by the GNSS device 14.

The control unit 2 is also provided with an emergency button 15, and the program of the control unit 2 is arranged to transmit an alarm signal over the mobile telecommunications network 10 whenever the user actuates the emergency button 15. The control program of the control unit 2 is also arranged to transmit such an alarm signal whenever the physiological parameter exceeds a predetermined alarm threshold. The alarm signal is transmitted for a central rescue station and it preferably includes the location of the bicycle 1 at the time at which the alarm signal was transmitted. The location of the bicycle may also be used to send the alarm signal to a rescue station that is in vicinity of the bicycle 1.

In its most elaborate version, the method of the invention starts with a setting stage in which the user connects to a server 100 via the Internet, and records with said server the data that concerns said user, namely:
 personal identification data and optionally a personal identification number or code;
 gender;
 age;
 body measurements including height and weight, and type of morphology;
 whether or not the user has a sedentary lifestyle;
 whether or not the user takes regular exercise, and, optionally whether or not the user belongs to a sports club or plays or does sport regularly;
 medical history;
 existence of particular diseases in the user's family; etc.

In this example, this data is recorded by means of a questionnaire filled in on line by the user. In a variant, the server may transmit to the user a questionnaire that the user should ask a physician to fill in. The user must then enter the answers to the questionnaire as filled in by the physician, or must scan the questionnaire as filled in by the physician and then transmit it to the server 100. Also in a variant, it is possible to make provision for some of this information to be obtained from a particular device that the user should acquire before connecting to the server. Such a device may, for example, be scales that calculate weight, body mass index, and fat mass index, and that establish a history of these measurements over a given period. The device may advantageously be directly connected to the user's computer so as to transmit the taken measurements to said computer.

The program executed by the server 100 then asks the user what objective the user is pursuing:
- does the user want to keep fit?
- lose weight?
- do cardio-training?
- etc.

Preferably, the user also indicates the frequency at which the user is prepared to use the bicycle 1 and over what length of journey.

A physician, or the program of the server 100 using a database established by a physician, then establishes a program of exercise for the user. On the basis of the data provided, it is possible to determine a duration and/or a distance and/or an intensity desirable for exercise, a number of calories to be "burnt off", and a heart rate threshold not to exceed. The server then more precisely establishes:
- an effort to be delivered by the user over the distance to travel or over the duration of the exercise, in order to achieve the objective; and
- a distribution of optimum values (referred to below as "target values") for the physiological parameter and for the effort to be delivered over the distance or over the duration of the exercise. It can be understood that the duration of the exercise is, in this example, the duration desired by the user, or a duration imposed by the physician or by the program of the server 100, and it corresponds to the duration of a journey made using the bicycle 1. It can also be understood that the distance of the exercise may be a distance chosen by the user, by the physician, or by the program of the server. For example, if the user decides to use the bicycle 1 at least twice a week for commuting, i.e. for going to work and home from work, the duration of the journey between home and work is then the distance of the exercise. In a variant, the user may choose to use the bicycle 1 for leisure, twice per week, and the user then chooses the length of time to be devoted to the exercise. The physiological parameter and the effort to be delivered by the user in the form of a distribution of target values over the distance or over the duration of the exercise (see FIG. 3, *a* and *b*) are downloaded by the user onto the external memory 8 that the user has connected to the user's computer 50. It can be understood that the program makes provision for three inputs on which determination of the target values depend, namely:
- the duration and/or distance of the exercise; and
- the effort.

The user then connects the external memory 8 to the connection means 7 of the control unit 2 in such a manner that the program of the control unit 2 can retrieve the threshold for the physiological parameter, the effort to be delivered by the user, and the distribution of the target values for said threshold and for said effort over the duration of the exercise.

Prior to using the bicycle 1, the user indicates to the GNSS device 14 the point of departure and the point of arrival. It should be noted that the point of arrival and the point of departure may be identical, with the user wishing to do a looped circuit, in which case the user should indicate a desired length of journey. The GNSS device 14 then computes a route. The control unit 2 then applies to the duration of the route the distribution of the target values for the physiological parameter and for the effort to be delivered by the user.

Figure 3:
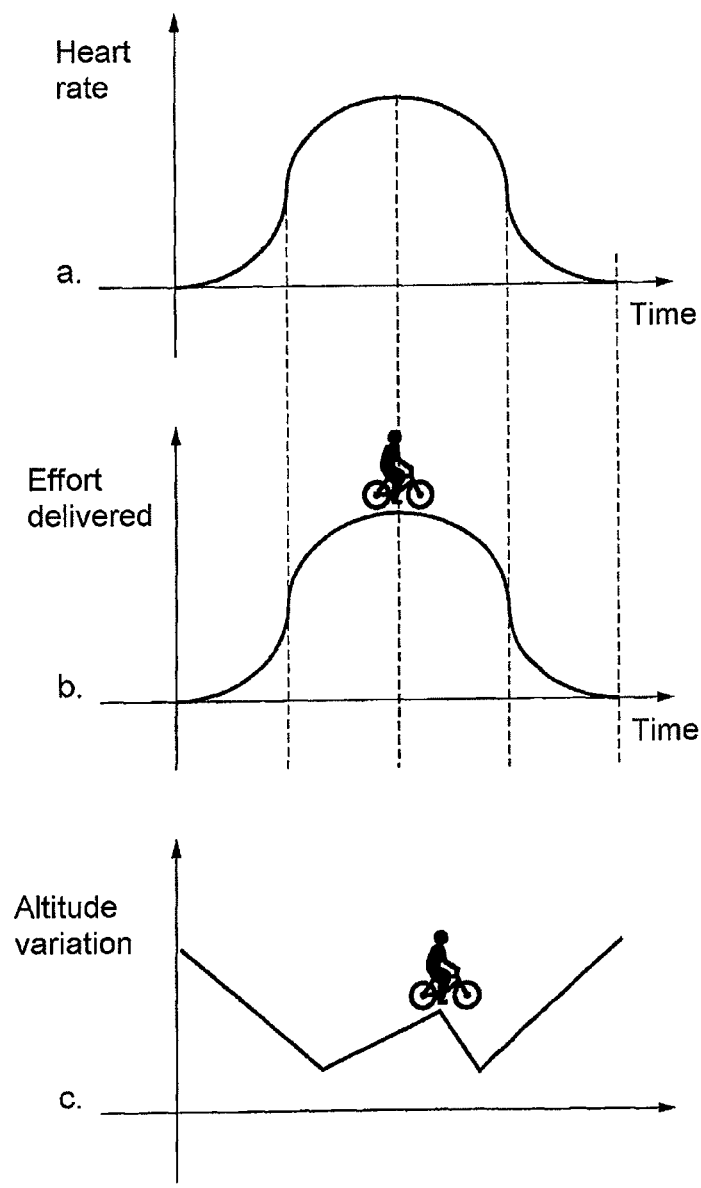
FIG. 3 shows graphs indicating how the effort expended by the user is managed as a function of the duration of the exercise.

When the user starts pedaling along the planned route, the control program 2 periodically determines the effort delivered by the electric motor 3 that either relieves the user or opposes the effort exerted by the user so as to comply with the distribution of the target values for the effort to be delivered by the user and for the physiological parameter. Altitude variation therefore does not influence the effort delivered by the user (FIG. 3, *b* and *c*). It should be noted that when the electric motor 3 opposes advance of the bicycle 1, it is in an alternator configuration enabling it to recharge the battery 4. In any event, the physiological parameter must never exceed the predetermined threshold that constitutes the threshold for transmission of the alarm signal.

In order to determine the effort to be delivered by the motor, the control unit 2 takes account not only of the target values but also of the following information:
- the geographical location of the vehicle;
- the state of charge of the battery; and
- the external data.

The control program of the control unit 2 is arranged to ask the GNSS device 14 to modify the route to take account of:
- the state of charge of the battery 4;
- the outdoor temperature or the presence of an allergen zone, degradation in weather conditions, or a traffic hold-up over a portion of the route on the basis of the external data collected from the bicycle 1 or received from the telecommunications network; and of
- tiredness of the user, as detected, for example, on the basis of the user's heart rate, body temperature, and/or blood pressure, etc.

When the state of charge of the battery is too low to comply with the distribution of the target values, provision may be made to modify the route so as to ensure that the state of charge of the battery will be sufficient up to the predetermined point of arrival. In a variant, the control unit 2 may inform the user that the electric motor 3 will be used only to assist the user for cycling uphill, and will not be used for resistance purposes, or the control unit 2 may inform the user that, if the user wishes to continue along the route to the point of arrival, the end portion of the route might have to be cycled without assistance from the electric motor 3.

The control unit 2 may also be provided with a quick return button enabling the user to signal to the control unit that said user wishes to cut short the exercise, e.g. because the user feels unwell or because it is starting to rain. The control unit 2 then controls the GNSS device 14 so that the route is modified in such a manner as to return directly to the point of departure or to go either to the point of departure or to the point of arrival depending on which is nearer. Advantageously, the quick return button being pressed may also lead to the electric motor 2 being controlled in such a manner that said motor assists the user optimally while taking account of the state of charge of the battery and of the distance remaining to travel. The control unit 2 may also be provided with an end of exercise button via which the user can signal to the control unit that said user no longer wants the motor to oppose the effort delivered by the user.

When the user has input such a wish when making settings, it is also possible to transmit the location of the vehicle periodically to the server via the telecommunications network, so that the server can:
- identify a certain number of users of the bicycle of the invention within the same geographical zone; and send to the control unit 2 an instruction to modify the route in such a manner as to cause said users to converge towards the same route portion.

Similarly, it is possible, with a permanent link between the control units and the server, to have users of different abilities and levels of fitness follow the same route. The motors are then controlled in synchronized manner via the server and via their control programs so that the users advance at the same speed while delivering different efforts. For example, the selected speed depends on the level of charge of the battery of the user in most need of assistance, the other users being assisted in achieving this speed if necessary by using the electric motors of their bicycles as brakes.

The control unit 2 is arranged to store in its memory route data, such as length or altitude variation, variation in the physiological parameter, and variation in the effort delivered by the user. All of the parameters stored in the memory are then used, in particular, for establishing target values for subsequent use of the bicycle 1. The parameters stored in the memory may, in addition, be transferred via the external memory 8 to the user's computer and then to the server in which the stored parameters are processed by a program arranged to perform at least one of the following operations:

determining target values for subsequent use of the vehicle;
formulating a diet adapted to energy expenditure computed on the basis of the parameters stored in the memory; and
archiving the stored parameters successively transmitted by the user and establishing a history of variation of at least one of said parameters.

Said history or the archived parameters may then be transmitted to the user or displayed on the user's computer at the user's request.

In a variant, it is possible to make provision for the control unit to set up a telephone link between the user and a physician whenever the physiological parameter exceeds a predetermined threshold in spite of the assistance delivered by the motor or whenever the bicycle stops in non-temporary manner before it has reached its point of arrival. To this end, it is possible to provide either a hands-free microphone-and-loudspeaker device on the control unit so as to enable the user to communicate with the physician, or else the control unit may be provided with a connection member for connecting to the mobile telephone or "cellphone", or it may be arranged like a docking station for receiving the user's mobile telephone (the control unit is then connected to the GSM telecommunications network via the user's telephone).

The control unit 2 may be provided with a screen for displaying messages of the Short Message Service (SMS) type warning the user that the route has been changed or that the servo-control of the motor has been changed on the instructions of the physician, e.g. in view of a variation in the physiological parameter that has been transmitted to the physician by the control unit 2 via the mobile telecommunications network.

The screen used to display information to the user may also be the screen of the GNSS device 14 or the screen of a personal digital assistant connected to the control unit 2 in wired or in wireless manner.

Preferably, a permanent link, e.g. via the GSM network, is set up between the control link 2 and the server. This permanent link enable to the control unit 2 to send, in real time to the server, the values of all of the monitored parameters and of all of the setpoint values for controlling the motor. The control unit preferably executes a program assigned to the task of permanently monitoring the state of said link in such a manner that the data can be transmitted and received as soon as the link with the server is active.

Advantageously, in particular when the bicycle is used for physiotherapy or medical rehabilitation, the server is programmed to compare said information with thresholds, and it alerts the medical team in the event that any one of said thresholds is exceeded, e.g. via SMS or via a prerecorded voice call. The medical team can, in addition, modify the control program on the server and can send an update to the control unit 2 so as to modify, in real time, the target values of the exercise being taken.

In this application, the medical team makes settings for the control program on the basis of one or more energy expenditure values or ranges, and on the basis of one or more exercise duration values or ranges, in association with values for the user's heart rate at rest, at work, and at a maximum not to be exceeded.

Advantageously, it is possible to provide means so that, going downhill, the user can brake the bicycle while also pedaling in the direction of advance, but rather than by pushing on the front leg, as in conventional pedaling, by pushing on the rear leg so as to generate an eccentric effort. In this version, the electric motor 3 is mounted in direct or indirect engagement with the rear wheel. The motor is thus mounted on the hub of the rear wheel or on the crankset, in series or in parallel therewith. The means may comprise a freewheel mechanism controllable so as to transmit the movement either in a single direction of rotation, or in, both directions of rotation. The control program may thus be arranged to manage the delivery by the user of concentric or eccentric efforts.

Naturally, the invention is not limited to the described implementation, and variant implementations may be provided without going beyond the ambit of the invention as defined by the claims.

In particular, it is possible to make provision for the user to be able to specify that said user wishes to take the exercise without becoming out of breath or without sweating (e.g. for the user's journey from home to work). In which case, the control unit 2 manages the effort from the electric motor 3 as a function of the physiological parameters so as to limit breathlessness or sweating.

The control unit 2 may be equipped with any type of wireless connection means, such as an infrared or radio link of the Bluetooth or WiFi type, or with any type of wired connection means, such as a USB-type or network link.

The method and the vehicle of the invention can be used in a private context or in a medical care context, e.g. for medical rehabilitation of a patient having suffered a "stroke", i.e. a cerebrovascular accident.

The route may be changed in the GNSS device 14.

Provision may be made have the exercise parameters modified directly in the control unit by the user, or, via a wireless link, by a physician to whom the user's physiological parameters have been transmitted, e.g. in real time by the control unit.

The server may be accessed directly or via any type of network: local; Local Area Network (LAN); Wide Area Network (WAN); intranet; or extranet.

In addition, at least one detector is arranged to detect at least one of the following kinds of external data: carbon monoxide contained in the ambient air; nitrogen oxide contained in the ambient air; particles contained in the air; allergen; and ambient temperature.

In a variant, the computer incorporated in the control unit may be external to the control unit and, for example, be the computer of an electronic device connected via a wireless or wired link to the control unit. This electronic device can be a GNSS device, a personal digital assistant, a telephone, etc.

Taking account of external data is optional.

What is claimed is:

1. A method of managing physical effort expended by a user of a human-propelled vehicle provided with a control unit connected to an electric motor that is powered by a battery and that is arranged to take the place at least in part of the user for the purposes of propelling and of braking the vehicle, as a function of a program executed by the control unit in order to manage the physical effort expended by the user, the control unit being connected to a GNSS device, the method comprising the steps of:
   determining firstly target values for at least one physiological value and for the effort delivered by the user, and secondly a route towards a predetermined point of arrival;
   acquiring information used by the control program, namely at least one geographical location of the vehicle, the physiological parameter of the user, a state of charge of the battery, an effort delivered by the motor, and the effort delivered by the user, said physiological parameter comprising one or more of the following measurements: heart rate; blood pressure; cardiac output; and body temperature; and
   controlling the motor as a function of the information and of the target values in such a way that over at least a portion of the route, said motor opposes the effort delivered by the user in order to achieve the target values.

2. The method according to claim 1, further comprising a step of setting up a link with a wireless communications network.

3. The method according to claim 2, further comprising a step of transmitting an alarm signal over the telecommunications network whenever the physiological parameter reaches a predetermined threshold, or whenever the user has actuated an emergency button of the control unit.

4. The method according to claim 2, wherein external data is downloaded from the communications network.

5. The method according to claim 2, wherein the location of the vehicle is periodically transmitted to a server via the telecommunications network, and is used for at least one of the following operations:
   causing users who are in the same geographical zone to converge towards the same route portion; and
   warning a rescue station if the server has also received an alarm signal coming from the vehicle via the telecommunications network.

6. The method according to claim 1, further comprising a prior step of loading a preprogrammed route into the GNSS device, and of loading a distribution of the effort delivered by the motor into the control unit, which distribution presents target values along said route.

7. The method according to claim 6, wherein the distribution of the effort is formulated for the purposes of keeping the body fit, of physiotherapy or medical rehabilitation, of keeping the heart fit, or indeed of slimming, etc.

8. The method according to claim 6, further comprising a step of storing in a memory in the control unit parameters including at least route data, the physiological parameter, and data representative of an effort delivered by the user, the target values being determined as a function of the parameters stored in the memory while the vehicle was being used on a preceding occasion.

9. The method according to claim 6, further comprising a step of transferring the stored parameters towards a server in which the stored parameters are processed by a program arranged to perform at least one of the following operations:
   determining target values for subsequent use of the vehicle;
   formulating a diet adapted to energy expenditure computed on the basis of the parameters stored in the memory; and
   archiving the stored parameters successively transmitted by the user and establishing a history of variation of at least one of said parameters.

10. The method according to claim 6, wherein the distribution of the target values is downloaded from the server and is recorded in the control unit during a setting step prior to use of the vehicle.

11. The method according to claim 1, wherein the information used by the program includes external data that is external to the vehicle and to the user.

12. The method according to claim 11, wherein the external data comprises one or more of the following kinds of data: ambient temperature; carbon monoxide content in the air; nitrogen oxide content in the air; weather data; presence of an allergen in the air, and state of road traffic.

13. The method according to claim 12, wherein the external data is downloaded into the control unit.

14. The method according to claim 11, wherein the external data is detected from the vehicle.

15. A human-propelled vehicle provided with a control unit connected to an electric motor that is powered by a battery and that is arranged to take the place at least in part of the user for the purposes of propelling and of braking the vehicle, as a function of a program executed by the control unit, the control unit further being connected to a GNSS device and to acquisition means for acquiring at least one physiological parameter of the user, an effort delivered by the user, a state of charge of the battery, and external data that is external to the user and to the vehicle, said physiological parameter comprising one or more of the following measurements: heart rate; blood pressure; cardiac output; and body temperature, the program being arranged to control the GNSS and to manage the effort delivered by the motor as a function of: target values for the physiological parameter and for the effort delivered by the user; a location of the vehicle relative to a predetermined point of arrival, and information from the acquisition means, said program being arranged to control the motor in such a way that over at least a portion of a route followed by the vehicle, said motor opposes the effort delivered by the user in order to achieve said target values.

16. The vehicle according to claim 15, further being provided with connection means for connecting to a mobile telecommunications network.

17. The vehicle according to claim 15, wherein the control unit has an emergency button, and the control program is arranged to transmit an alarm signal over the telecommunications network whenever the user actuates the emergency button.

18. The vehicle according to claim 15, wherein the control program is arranged to transmit an alarm signal over the telecommunications network whenever the physiological parameter exceeds an alarm threshold.

19. The vehicle according to claim 15, wherein the control unit is arranged to receive the external data from the mobile telecommunications network.

20. The vehicle according to claim 15, provided with at least one detector arranged to detect at least one of said physiological parameters.

21. The vehicle according to claim 15, provided with at least one detector arranged to detect at least one of the following kinds of external data: carbon monoxide content in the ambient air; nitrogen oxide content in the ambient air; particles contained in the air, allergen; and ambient temperature.

22. The vehicle according to claim 15, wherein the control unit is provided with connection means for connecting to at least one external memory module.

23. The vehicle according to claim 15, wherein the control unit is provided with connection means for connecting to a mobile telephone of the user.

* * * * *